United States Patent
Wang

(10) Patent No.: US 11,671,553 B2
(45) Date of Patent: Jun. 6, 2023

(54) VIDEO SIGNAL PROCESSING METHOD FOR BRIGHTNESS ADJUSTMENT

(71) Applicant: REALTEK SEMICONDUCTOR CORP., HsinChu (TW)

(72) Inventor: Cheng-Hao Wang, HsinChu (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 0 days.

(21) Appl. No.: 17/534,858

(22) Filed: Nov. 24, 2021

(65) Prior Publication Data

US 2023/0062367 A1   Mar. 2, 2023

(30) Foreign Application Priority Data

Aug. 30, 2021   (TW) ................. 110132160

(51) Int. Cl.
*G09G 5/10* (2006.01)
*H04N 5/20* (2006.01)

(52) U.S. Cl.
CPC .............. *H04N 5/20* (2013.01); *G09G 5/10* (2013.01); *G09G 2320/0626* (2013.01); *G09G 2360/16* (2013.01)

(58) Field of Classification Search
CPC .... H04N 5/20; G09G 5/10; G09G 2320/0626; G09G 2360/16
See application file for complete search history.

(56) References Cited

U.S. PATENT DOCUMENTS

| | | | | |
|---|---|---|---|---|
| 11,297,292 | B2* | 4/2022 | Aoyanagi | H04N 9/3194 |
| 2017/0124983 | A1* | 5/2017 | Atkins | G09G 5/06 |
| 2018/0122058 | A1* | 5/2018 | Kang | G09G 3/2092 |
| 2021/0152801 | A1* | 5/2021 | Wang | H04N 9/64 |
| 2021/0201852 | A1* | 7/2021 | Lee | G09G 3/20 |
| 2021/0360266 | A1* | 11/2021 | Van Der Vleuten | H04N 19/46 |
| 2022/0122236 | A1* | 4/2022 | Yu | G09G 5/10 |

FOREIGN PATENT DOCUMENTS

CN          101183513 A     5/2008

* cited by examiner

*Primary Examiner* — Rodney Amadiz
(74) *Attorney, Agent, or Firm* — Birch, Stewart, Kolasch & Birch, LLP

(57) ABSTRACT

A video signal processing device and method thereof are provided in the present application. The video processing device includes a storage and a processor. The storage stores a plurality of brightness mapping relationships. If set brightness corresponding to the brightness mapping relationships does not match the target brightness, the processor selects a first mapping relationship and a second mapping relationship of two pieces of set brightness closing to target brightness from the brightness mapping relationships. A target mapping relationship corresponding to the target brightness is obtained by an interpolation according to the first mapping relationship, the first brightness, the second mapping relationship and the corresponding set brightness. The processor converts nonlinear brightness information of a first video signal into linear brightness information of a second video signal according to the target mapping relationship.

8 Claims, 4 Drawing Sheets

VIDEO SIGNAL PROCESSING METHOD FOR BRIGHTNESS ADJUSTMENT

CROSS-REFERENCE TO RELATED APPLICATION

This non-provisional application claims priority under 35 U.S.C. § 119(a) to Patent Application No. 110132160 filed in Taiwan, R.O.C. on Aug. 30, 2021, the entire contents of which are hereby incorporated by reference.

BACKGROUND

Technical Field

The present application relates to a technique of signal processing. In particular, a video signal processing device and method.

Related Art

In the standard of HDR10, the Perceptual Quantization (PQ) Electro-Optical Transfer Function (EOTF) adopted determines the corresponding conversion relationship between the video signal and the display brightness. However, the display brightness of the display panel is affected by both the video signal and backlight intensity. When adjusting the backlight brightness of the display panel without adjusting the PQ EOTF in correspond, the display brightness of the display panel will not exhibit the correct brightness effect. For example, if the PQ EOTF is established based on the maximum brightness of 324 nits, the display brightness will drop to 250/324 times when the backlight brightness is adjusted to 250 nits.

SUMMARY

In view of this, an embodiment of the present application provides a video signal processing method, including: reading a plurality of brightness mapping relationships, wherein the brightness mapping relationships are represented mapping relationship between a nonlinear brightness signal and a linear brightness signal, and each brightness mapping relationship corresponds to different set brightness; selecting a first mapping relationship and a second mapping relationship of the set brightness closing to target brightness from the brightness mapping relationships if the set brightness corresponding to the brightness mapping relationships does not match the target brightness, wherein the target brightness is between a first brightness and a second brightness, the first mapping relationship corresponds to the first brightness, and the second mapping relationship corresponds to the second brightness; obtaining a target mapping relationship corresponding to the target brightness by an interpolation according to the first mapping relationship, the first brightness, the second mapping relationship, and the second brightness; and converting nonlinear brightness information of a first video signal into linear brightness information of a second video signal according to the target mapping relationship.

An embodiment of the present application further provides a video signal processing device, including a storage and a processor. The storage stores a plurality of brightness mapping relationships, wherein the brightness mapping relationships are represented mapping relationship between a nonlinear brightness signal and a linear brightness signal, and each brightness mapping relationship corresponds to different set brightness. The processor is coupled to the storage. The processor selects a first mapping relationship and a second mapping relationship of the set brightness closing to target brightness from the brightness mapping relationships if the set brightness corresponding to the brightness mapping relationships does not match the target brightness, wherein the target brightness is between a first brightness and a second brightness, the first mapping relationship corresponds to the first brightness, and the second mapping relationship corresponds to the second brightness. The processor further obtains a target mapping relationship corresponding to the target brightness by an interpolation according to the first mapping relationship, the first brightness, the second mapping relationship, and the second brightness and converts nonlinear brightness information of a first video signal into linear brightness information of a second video signal according to the target mapping relationship.

According to the embodiments provided in the present application, the target display brightness can be correctly displayed, according to the set brightness, without consuming a large amount of storage space to store the brightness mapping relationships corresponding to various set brightness. Furthermore, in response to the correct brightness can be displayed according to the arbitrarily set brightness within the brightness control range, the users can experience the feeling of non-segment fine-adjusting brightness (gradual change in brightness).

BRIEF DESCRIPTION OF THE DRAWINGS

The disclosure will become more fully understood from the detailed description given herein below for illustration only, and thus not limitative of the disclosure, wherein.

DETAILED DESCRIPTION

The used term "couple to" herein represents that two or more elements are directly physical or electrical contact with each other, or may further represent that two or more elements are indirectly electrical contact with each other.

Figure 1:
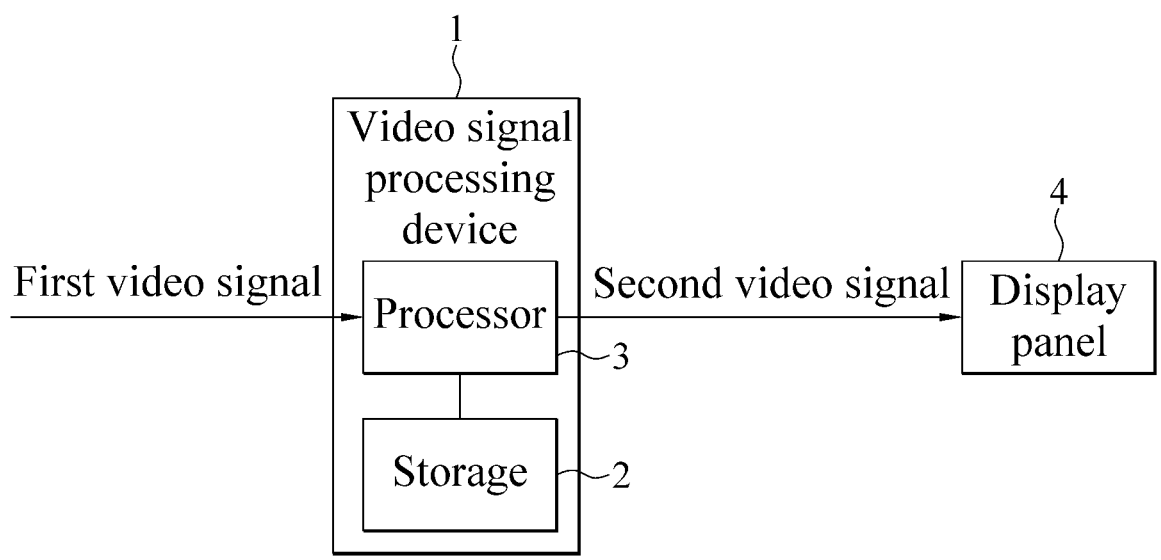
FIG. 1 illustrates a schematic diagram of a structure of a video signal processing device of an embodiment of the present application.

Refer to FIG. 1, a schematic diagram of a structure of a video signal processing device 1 of an embodiment of the present application. The video signal processing device 1 includes a storage 2 and a processor 3. The processor 3 of the video signal processing device 1 is coupled to a display panel 4 to transmit a video signal to the display panel 4 for display after processing the video signal.

Figure 2:
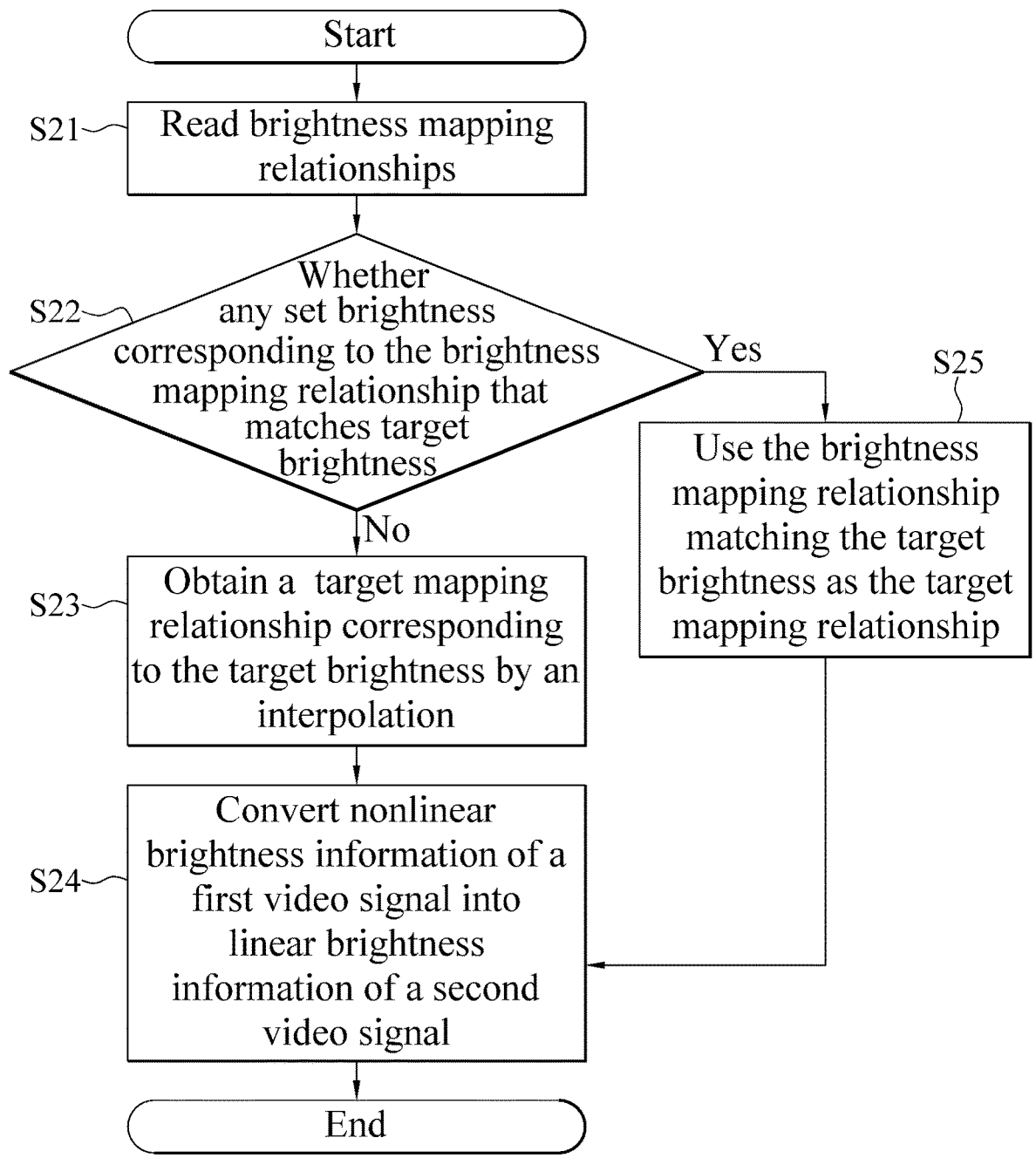
FIG. 2 illustrates a flowchart of a video signal processing method of an embodiment of the present application.

Refer to FIG. 2, a flowchart of a video signal processing method of an embodiment of the present application. The video signal processing method is executed by the processor 3. First, read a plurality of brightness mapping relationships from the storage (step S21). These brightness mapping relationships are stored in the storage 2 in advance. The brightness mapping relationship is represented a mapping relationship between nonlinear brightness information and linear brightness information. Each brightness mapping relationship corresponds to different set brightness. The set brightness is referred to as the specific brightness of the display panel 4 within a brightness control range. The maximum value of the brightness control range is the maximum luminous intensity, that is, peak luminance. For example, when the brightness control range is 40%-100% of the peak luminance, the segment brightness may be 40%, 55%, 70%, 85%, and 100% of the peak luminance.

For liquid crystal displays, peak luminance refers to the display brightness of the maximum backlight intensity. For organic light-emitting diode displays, peak luminance refers to the maximum display brightness under different average picture levels (APLs).

Take the standard of HDR10 as an example, the PQ EOTF adopted is the aforementioned brightness mapping relationship, as details shown in equation 1, which can convert nonlinear brightness information (the nonlinear code N of the target color gamut herein) into linear brightness information (the linear code L of the target color gamut herein). The value of the linear code L of the target color gamut is between 0 and 1. The value of the nonlinear code N of the target color gamut is a normalized value between 0 and 1. For example, if the code length is 10 bits, then N is between [0~1023]/1023. m1~m2 and c1~c3 are constants. For example, m1 is (2610/4096)×(1/4), m2 is (2523/4096)×128, c1 is 3424/4096, c2 is 2413/4096×32, and C3 is 2329/4096×32. Furthermore, it is possible to convert, through equation 2, the linear code L of the target color gamut into output brightness C, wherein the unit is a nit.

$$L = \left( \frac{\max\left[ (N^{1/m2} - c1), 0 \right]}{c2 - c3N^{1/m2}} \right)^{1/m1} \quad \text{Equation (1)}$$

$$C = 10000L \quad \text{Equation (2)}$$

$$C = 10000L \quad \text{Equation (2)}$$

In some embodiments, each brightness mapping relationship is stored in a form of a one-dimensional lookup table. That is, the nonlinear code N of the target color gamut is used as an index, and the linear code L of the target color gamut corresponding to each index is stored in a one-dimensional lookup table.

As shown in FIG. 2, in step S22, it is determined that whether any set brightness corresponding to the brightness mapping relationship that matches target brightness. Herein, the target brightness refers to the brightness setting to be adjusted of the display panel 4 and is within the brightness control range of the display panel 4. Continue to the aforementioned example in which the segment brightness is 40%, 55%, 70%, 85%, and 100% of the peak luminance. If the target brightness is for example 80% of the peak luminance, the plurality of set brightness does not match the target brightness so step S23 is entered. In an example, if the target brightness is 70% of the peak luminance, one of the set brightness matches the target brightness so step S25 is entered. Through step S23 or step S25, the target mapping relationship can be obtained. Finally, in step S24, according to the target mapping relationship, the nonlinear brightness information of a first video signal can be converted into the linear brightness information of a second video signal, such that the display panel 4 can display images according to this.

In step S25, the brightness mapping relationship matched with the target brightness is directly used as the target mapping relationship.

In step S23, firstly select the brightness mapping relationships corresponding to two pieces of set bright closing to the target brightness from the brightness mapping relationships. Following the aforementioned example, two pieces of set bright (hereinafter referred to as first brightness and second brightness) closing to 80% of the peak luminance are 70% and 85% of the peak luminance. Herein, the target brightness is between the first brightness and the second brightness. Hereinafter, the brightness mapping relationship corresponding to the first brightness is referred to as a first mapping relationship, and the brightness mapping relationship corresponding to the second brightness is referred to as a second mapping relationship. After that, obtain the brightness mapping relationship corresponding to the target brightness (hereinafter referred to as target mapping relationship) by an interpolation according to the first mapping relationship, the first brightness, the second mapping relationship, and the second brightness. Specifically, it can be expressed as equation 3 and equation 4. BR is a blend ratio of the interpolation. $L_T$ is the target brightness, $L_1$ is the first brightness, and $L_2$ is the second brightness. Herein, $LV_T(n)$ is used to represent the target display brightness, $EOTF_T(n)$ is used to represent the target mapping relationship, $EOTF_1(n)$ is used to represent the first mapping relationship, and $EOTF_2(n)$ is used to represent the second mapping relationship, wherein n is the index entry.

$$BR = \frac{L_T - L_1}{L_2 - L_1} \quad \text{Equation (3)}$$

$$\begin{aligned} LV_T(n) &= EOTF_T(n) \times L_T \\ &= (1 - BR) \times EOTF_1(n) \times L_1 + BR \times EOTF_2(n) \times L_2 \end{aligned} \quad \text{Equation (4)}$$

Figure 3:
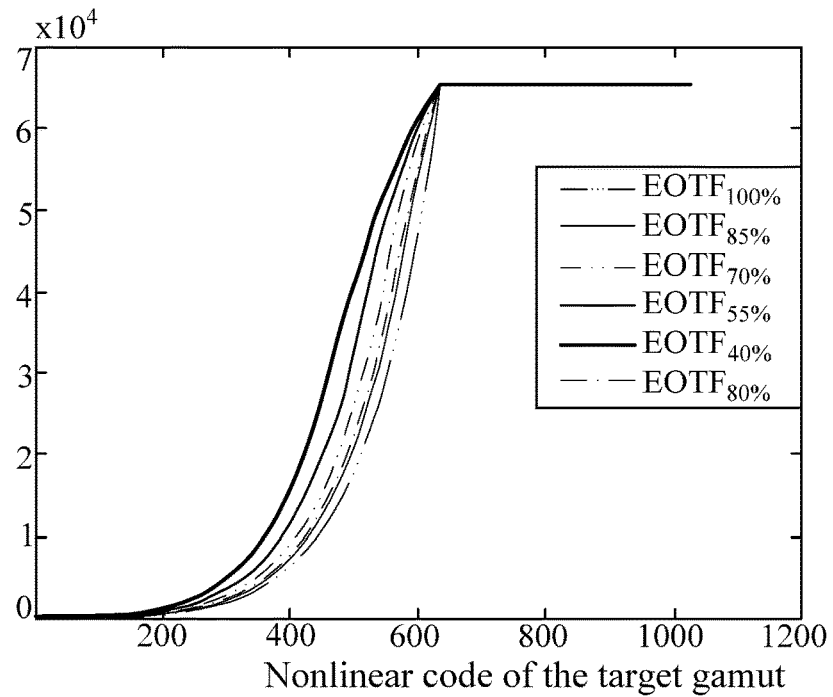
FIG. 3 illustrates schematic diagram of serval brightness mapping relationships of an embodiment of the present application.
Figure 4:
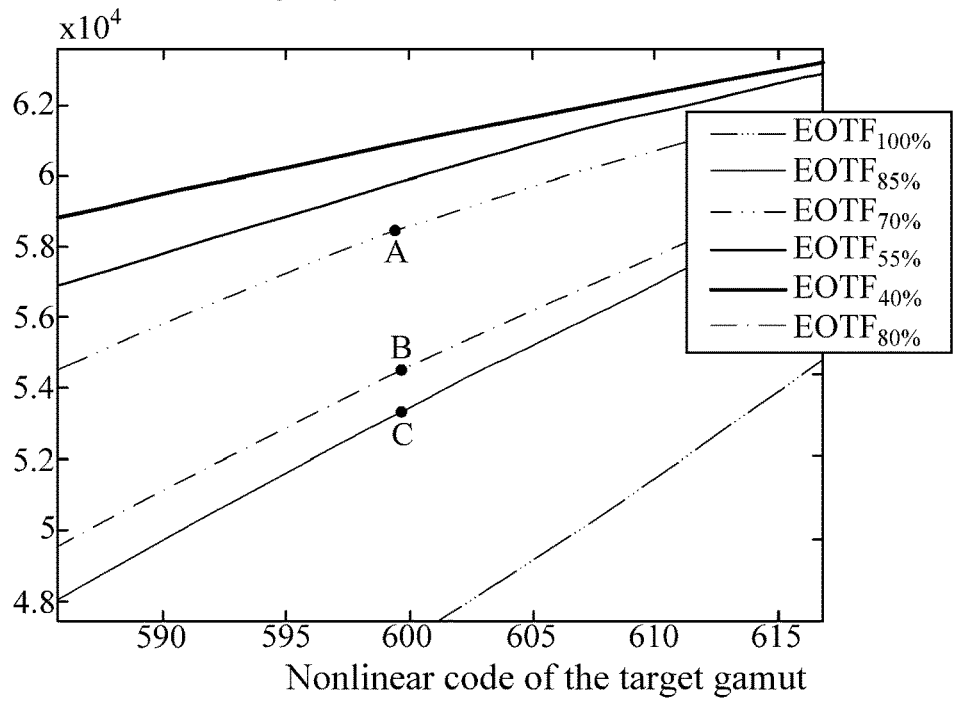
FIG. 4 illustrates an enlarged diagram of a part of FIG. 3.
Figure 5:
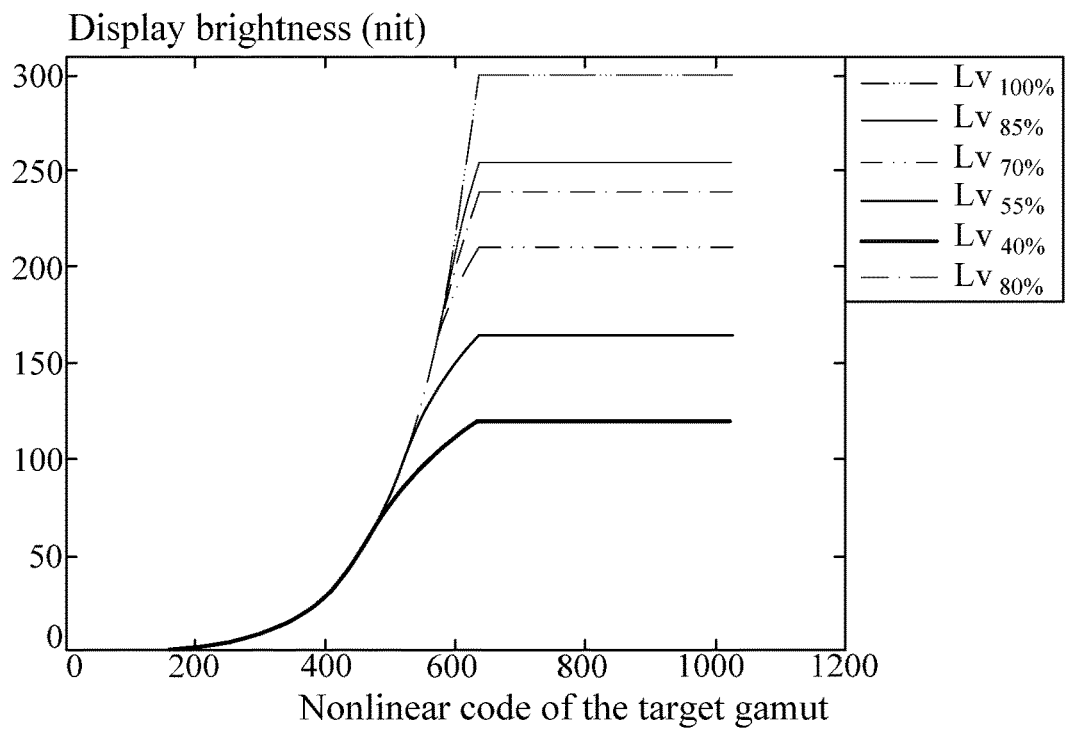
FIG. 5 illustrates a schematic diagram of serval display brightness of an embodiment of the present application.
Figure 6:
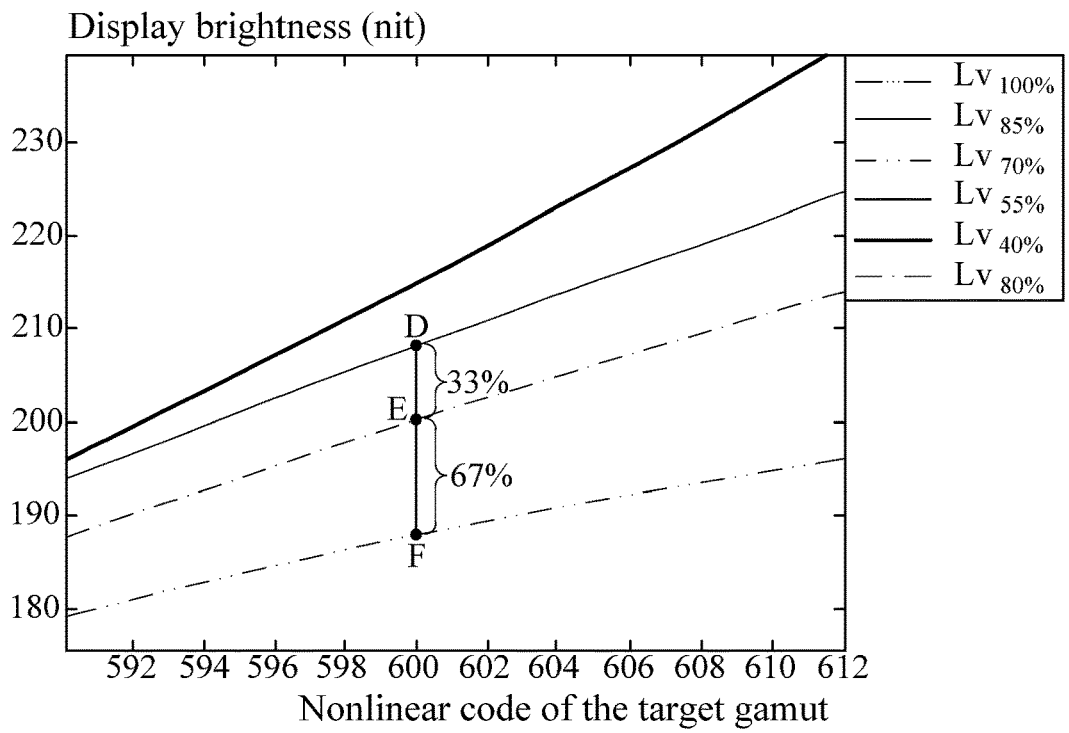
FIG. 6 illustrates an enlarged diagram of a part of FIG. 5.

The following gives an example to illustrate how to obtain the target mapping relationship corresponding to the target brightness by interpolation. Refer from FIG. 3 to FIG. 6 in combination. FIG. 3 illustrates schematic diagram of serval brightness mapping relationships of an embodiment of the present application. FIG. 4 illustrates an enlarged diagram of a part of FIG. 3. FIG. 5 illustrates a schematic diagram of serval display brightness of an embodiment of the present application. FIG. 6 illustrates an enlarged diagram of a part of FIG. 5. In this example, the peak luminance is 300 nits. Each one-dimensional lookup table has 1024 index entries, and its precision is 16 bits and the maximum value is 65472. As shown in FIG. 3, brightness mapping relationships $EOTF_{40\%}$, $EOTF_{55\%}$, $EOTF_{70\%}$, $EOTF_{85\%}$, and $EOTF_{100\%}$ respectively corresponding to 40%, 55%, 70%, 85% and, 100% of the peak luminance are illustrated. Continuing the example that the target brightness $L_T$ is 80% of the peak luminance, the first brightness $L_1$ and the second brightness $L_2$ are respectively 70% and 85% of the peak luminance. Therefore, the first mapping relationship and the second mapping relationship are respectively $EOTF_{70\%}$, and $EOTF_{85\%}$. As shown in FIG. 4, take the index entry n as 600 for example. $EOTF_{70\%(600)}=58570$ (point A). $EOTF_{85\%(600)}=53440$ (point C). BR is calculated as $$\frac{80 - 70}{85 - 70} \approx 67\%$$

according to equation 3. As shown in FIG. 6, the real display brightness $Lv_{70\%}$ corresponding to the first brightness $L_1$ is equal to $$EOTF_{70\%} \times L_1 = \frac{58570}{65472} \times 300 \times 70\% \approx 187.86$$

nits (point F). The real display brightness $Lv_{85\%}$ corresponding to the second brightness $L_2$ is equal to $$EOTF_{85\%} \times L_2 = \frac{53440}{65472} \times 300 \times 85\% \approx 208.14$$

nits (point D). According to equation 4, the target display brightness $LV_T(600) = 33\% \times 187.86 + 67\% \times 208.14 \approx 201.45$ nits (point E). Divide the target display brightness $LV_T(600)$ by the target brightness $L_T$, and get $$EOTF_{80\%}(600) = \frac{201.45}{240} \times 655472 \approx 54956$$

(point B).

From FIG. 6, it can be seen that the target display brightness can be correctly displayed, according to the set brightness through the aforementioned method, without consuming a large amount of storage space to store the brightness mapping relationships corresponding to various set brightness. Furthermore, in response to the correct brightness can be displayed according to the arbitrarily set brightness within the brightness control range, the users can experience the feeling of non-segment fine-adjusting brightness (gradual change in brightness).

In some embodiments, the set brightness corresponding to the brightness mapping relationships is evenly distributed within the brightness control range. In this way, the values of the interpolation calculation performed in the sections between each set brightness can be balanced and accurate.

In some embodiments, the backlight brightness is controlled through pulse-width modulation dimming (PWM dimming). Therefore, the processor 3 can estimate the target brightness according to pulse-width modulation (PWM) information.

In some embodiments, the processor 3 may further perform other processing on the second video signal, such as tone mapping, color transfer, gamma correction, and so on. Since the maximum corresponding brightness of PQ EOTF is 10,000 nits while the brightness capability of the most display panels 4 is approximately within 1,000 nits, tone mapping can map the brightness to the display capability range of the display panel 4. Color transfer is to convert the linear code L of the target color gamut into the linear code corresponding to the color gamut of the display panel 4, such that appears the same color after the code conversion. Gamma correction can linearize the characteristics of the display panel 4.

In some embodiments, the first video signal is obtained by the processor 3 from other devices, such as other processing devices, video signal interfaces, other storage devices, and so on.

The aforementioned processor 3 may be, for example, a microprocessor, a system-on-chip (SOC), or the like. The storage 2 is a non-volatile storage medium, such as flash memory, electronically erasable programmable read-only memory (EEPROM), and so on. In some embodiments, the processor 3 may be implemented by a plurality of processing devices together. In some embodiments, the processor 3 and the storage 2 can be implemented by being integrated into a single device, such as a scaler IC. In some embodiments, the processor 3 and the storage 2 are separate independent devices.

To sum up, according to some embodiments of the present application, the target display brightness can be correctly displayed, according to the set brightness, without consuming a large amount of storage space to store the brightness mapping relationships corresponding to various set brightness. Furthermore, in response to the correct brightness can be displayed according to the arbitrarily set brightness within the brightness control range, the users can experience the feeling of non-segment fine-adjusting brightness (gradual change in brightness).

What is claimed is:

1. A video signal processing method, comprising:
    reading a plurality of brightness mapping relationships, wherein the plurality of brightness mapping relationships are represented mapping relationship between a nonlinear brightness signal and a linear brightness signal, and each of the plurality of brightness mapping relationships corresponds to different set brightness;
    selecting a first mapping relationship and a second mapping relationship of the set brightness closing to target brightness from the plurality of brightness mapping relationships if the set brightness corresponding to the plurality of brightness mapping relationships does not match the target brightness, wherein the target brightness is between a first brightness and a second brightness, the first mapping relationship corresponds to the first brightness, and the second mapping relationship corresponds to the second brightness;
    obtaining a target mapping relationship corresponding to the target brightness by an interpolation according to the first mapping relationship, the first brightness, the second mapping relationship, and the second brightness; and
    converting nonlinear brightness information of a first video signal into linear brightness information of a second video signal according to the target mapping relationship;
    wherein the set brightness corresponding to the plurality of brightness mapping relationships is an arithmetic progression and distributed within the brightness control range.

2. The video signal processing method according to claim 1, wherein the set brightness corresponding to the plurality of brightness mapping relationships is within a brightness control range of a display panel.

3. The video signal processing method according to claim 1, wherein each of the plurality of brightness mapping relationships is stored in a form of a one-dimensional lookup table.

4. The video signal processing method according to claim 1, further comprising:
    using the brightness mapping relationship matched the target brightness as the target mapping relationship if one of the set brightness corresponding to the plurality of brightness mapping relationships matches the target brightness.

5. A video signal processing device, comprising:
    a storage, storing a plurality of brightness mapping relationships, wherein the plurality of brightness mapping relationships are represented mapping relationship between a nonlinear brightness signal and a linear brightness signal, and each of the plurality of brightness mapping relationships corresponds to different set brightness; and a processor, coupled to the storage, the processor selects a first mapping relationship and a second mapping relationship of the set brightness closing to target brightness from the plurality of brightness mapping relationships if the set brightness corresponding to the plurality of brightness mapping relationships does not match the target brightness, wherein the target brightness is between a first brightness and a second brightness, the first mapping relationship corresponds to the first brightness, and the second mapping relationship corresponds to the second brightness; and the processor obtains a target mapping relationship corresponding to the target brightness by an interpolation according to the first mapping relationship, the first brightness, the second mapping relationship, and the second brightness, and the processor converts nonlinear brightness information of a first video signal into linear brightness information of a second video signal according to the target mapping relationship;

wherein the set brightness corresponding to the plurality of brightness mapping relationships is an arithmetic progression and distributed within the brightness control range.

6. The video signal processing device according to claim 5, wherein the set brightness corresponding to the plurality of brightness mapping relationships is within a brightness control range of a display panel.

7. The video signal processing device according to claim 5, wherein each of the plurality of brightness mapping relationships is stored in a form of a one-dimensional lookup table.

8. The video signal processing device according to claim 5, wherein the processor uses the brightness mapping relationship matched the target brightness as the target mapping relationship if one of the set brightness corresponding to the plurality of brightness mapping relationships matches the target brightness.

* * * * *